(12) United States Patent
Seo et al.

(10) Patent No.: US 9,907,030 B2
(45) Date of Patent: *Feb. 27, 2018

(54) METHOD AND DEVICE FOR CONTROLLING TRANSMISSION POWER FOR UPLINK CONTROL CHANNEL IN CARRIER AGGREGATION SYSTEM

(71) Applicant: LG ELECTRONICS INC., Seoul (KR)

(72) Inventors: Dongyoun Seo, Seoul (KR); Joonkui Ahn, Seoul (KR); Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,562

(22) Filed: Dec. 20, 2016

(65) Prior Publication Data

US 2017/0105181 A1    Apr. 13, 2017

Related U.S. Application Data

(63) Continuation of application No. 14/425,294, filed as application No. PCT/KR2013/008128 on Sep. 9, 2013, now Pat. No. 9,554,372.

(Continued)

(51) Int. Cl.
*H04W 52/32* (2009.01)
*H04W 52/14* (2009.01)
(Continued)

(52) U.S. Cl.
CPC ....... *H04W 52/325* (2013.01); *H04W 52/146* (2013.01); *H04W 52/242* (2013.01); *H04W 72/0413* (2013.01); *H04W 76/028* (2013.01)

(58) Field of Classification Search
CPC ............. H04W 52/325; H04W 52/146; H04W 52/242; H04W 72/0413; H04W 76/028
See application file for complete search history.

(56) References Cited

U.S. PATENT DOCUMENTS

| | | | |
|---|---|---|---|
| 2008/0318608 A1 | 12/2008 | Inoue | H04B 1/707 455/509 |
| 2009/0197630 A1* | 8/2009 | Ahn | H04L 1/0029 455/522 |

FOREIGN PATENT DOCUMENTS

| | | |
|---|---|---|
| KR | 10-2011-0047970 | 5/2011 |
| KR | 10-2011-0093169 | 8/2011 |

OTHER PUBLICATIONS

Huawei, "UL Power Control in Carrier Aggregation," 3GPP TSG RAN WG1 Meeting #59bis, R1-100244, Jan. 2010, 5 pages.

(Continued)

*Primary Examiner* — Ronald B Abelson
(74) *Attorney, Agent, or Firm* — Lee Hong Degerman Kang Waimey

(57) ABSTRACT

Provided are a method of controlling transmission power for an uplink control channel for a terminal to which a plurality of cells are assigned, and a device using the method. The method receives a first set of parameters and a second set of parameters that are used for determining transmission power for the uplink control channel and determines the transmission power for the uplink control channel by using the first set of parameters or the second set of parameters, wherein the first set of parameters or the second set of parameters is used according to one of the cells to which the uplink control channel is transmitted.

18 Claims, 12 Drawing Sheets

Related U.S. Application Data

(60) Provisional application No. 61/697,811, filed on Sep. 7, 2012.

(51) Int. Cl.
*H04W 52/24* (2009.01)
*H04W 72/04* (2009.01)
*H04W 76/02* (2009.01)

(56) References Cited

OTHER PUBLICATIONS

PCT International Application No. PCT/KR2013/008128, Written Opinion of the International Searching Authority dated Dec. 24, 2013, 1 page.

\* cited by examiner

METHOD AND DEVICE FOR CONTROLLING TRANSMISSION POWER FOR UPLINK CONTROL CHANNEL IN CARRIER AGGREGATION SYSTEM

CROSS-REFERENCE TO RELATED APPLICATIONS

This application is a continuation of U.S. patent application Ser. No. 14/425,294, filed on Mar. 2, 2015, now U.S. Pat. No. 9,554,372, which is the National Stage filing under 35 U.S.C. 371 of International Application No. PCT/KR2013/008128, filed on Sep. 9, 2013, which claims the benefit of U.S. Provisional Application No. 61/697,811, filed on Sep. 7, 2012, the contents of which are all hereby incorporated by reference herein in their entirety.

BACKGROUND OF THE INVENTION

Field of the Invention

The present invention relates to wireless communications, and more particularly, to a method of controlling transmission power of an uplink control channel in a carrier aggregation system, and an apparatus using the method.

Related Art

Long term evolution (LTE) based on 3rd generation partnership project (3GPP) technical specification (TS) release 8 is a promising next-generation mobile communication standard.

Although a carrier having various bandwidths is provided in LTE, it is premised that communication is performed basically using one carrier.

Meanwhile, 3GPP LTE-advanced (A) which is an evolution of 3GPP LTE is under development. A carrier aggregation (CA) is a technique employed in the 3GPP LTE-A.

The CA uses a plurality of component carriers (CCs). The CC is defined with a center frequency and a bandwidth. One downlink (DL) CC or a pair of an uplink (UL) CC and a DL CC corresponds to one cell. When a user equipment receives a service by using a plurality of DL CCs, it can be said that the user equipment receives the service from a plurality of serving cells.

Conventionally, a user equipment to which a plurality of serving cells are configured can transmit an uplink control channel only through a specific cell called a primary cell among the plurality of serving cells. Therefore, it is specified that transmission power of the uplink control channel is determined by considering only the primary cell.

However, a future wireless communication system can transmit the uplink control channel also in different cells other than the primary cell among a plurality of aggregated cells. There is a need for a method and apparatus for controlling transmission power of the uplink control channel, which can be applied to the future wireless communication system.

SUMMARY OF THE INVENTION

The present invention provides a method of controlling transmission power of an uplink control channel in a carrier aggregation system, and an apparatus using the method.

In an aspect, a method of controlling transmission power of an uplink control channel of a user equipment for which a plurality of cells are configured is provided. The method comprises receiving a first parameter set and a second parameter set which are used to determine the transmission power of the uplink control channel; and determining the transmission power of the uplink control channel by using the first parameter set or the second parameter set. The first parameter set or the second parameter set is used according to a cell in which the uplink control channel is transmitted among the plurality of cells.

In another aspect, a user equipment is provided. The user equipment comprises a radio frequency (RF) unit for transmitting and receiving a radio signal; and a processor operatively coupled to the RF unit. The processor is configured for: receiving a first parameter set and a second parameter set which are used to determine the transmission power of the uplink control channel; and determining the transmission power of the uplink control channel by using the first parameter set or the second parameter set, wherein the first parameter set or the second parameter set is used according to a cell in which the uplink control channel is transmitted among the plurality of cells.

Transmission power of an uplink control channel can be effectively configured in a carrier aggregation system in which a plurality of serving cells are configured for a user equipment.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved Node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
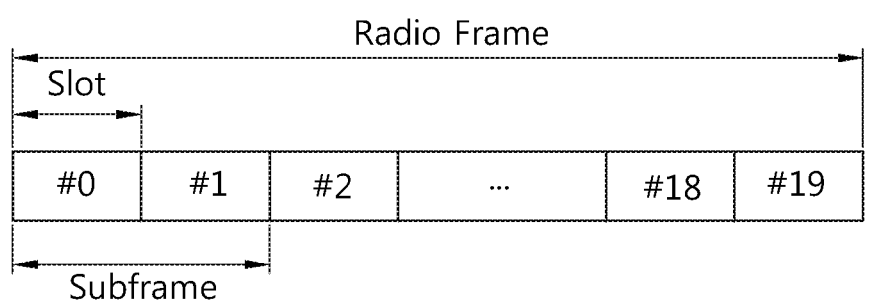
FIG. 1 shows a structure of a frequency division duplex (FDD) radio frame.

FIG. 1 shows a structure of an FDD radio frame.

The FDD radio frame (hereinafter, simply referred to as FDD frame) includes 10 subframes. One subframe includes two consecutive slots. Slots included in the radio frame are indexed from 0 to 19. A time required to transmit one subframe is defined as a transmission time interval (TTI). The TTI may be a minimum scheduling unit. For example, one subframe may have a length of 1 milliseconds (ms), and one slot may have a length of 0.5 ms. An FDD radio frame may include the same number of (for example, 10) uplink subframes and downlink subframes at different frequency bands.

Figure 2:
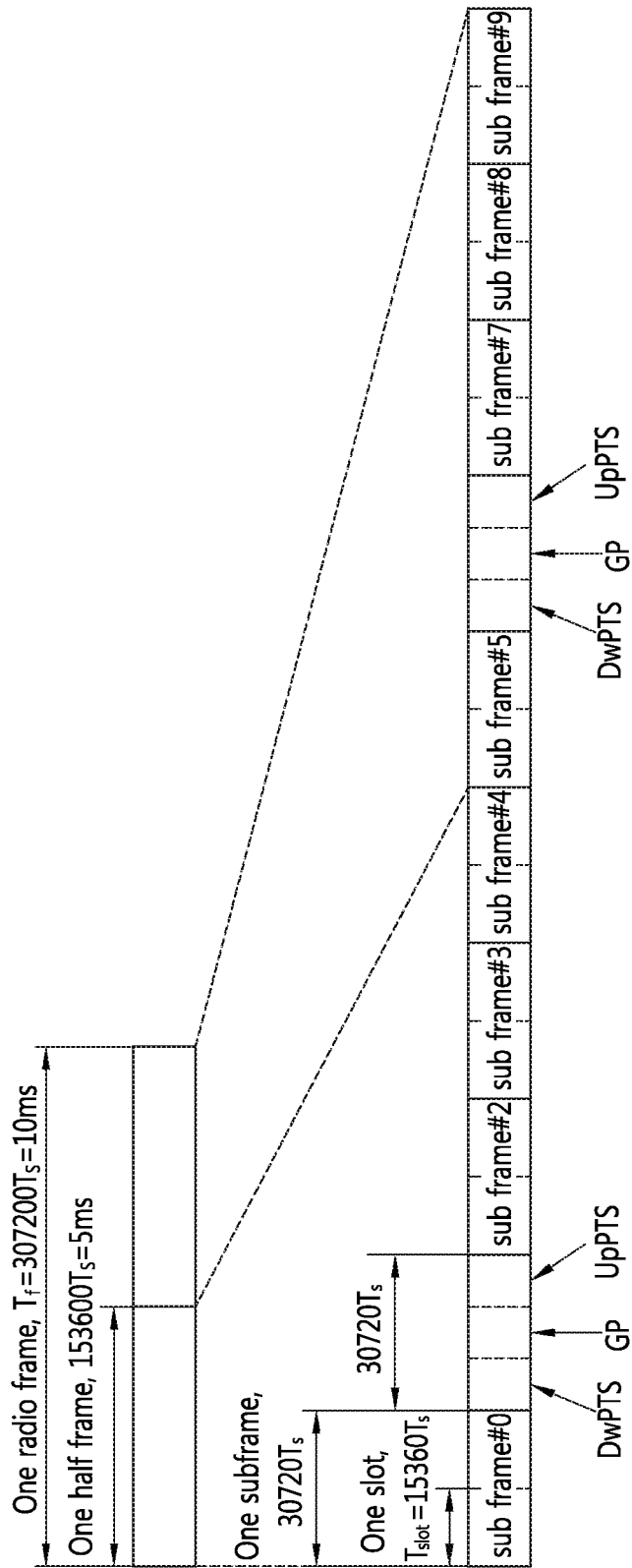
FIG. 2 shows a structure of a time division duplex (TDD) radio frame.

FIG. 2 shows a structure of a TDD radio frame.

Referring to FIG. 2, the TDD radio frame (hereinafter, TDD frame) includes 10 subframes. When subframes are indexed from 0 to 9, a subframe having an index #1 and an index #6 is called a special subframe (simply referred to as an S subframe), and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink.

In the TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, 'D' denotes a DL subframe, 'U' denotes a UL subframe, and 'S' denotes a special subframe. Upon receiving the UL-DL configuration from the BS, the UE can know whether each subframe is a DL subframe or a UL subframe in the TDD subframe. Hereinafter, a UL-DL configuration N (where N is any one value from 0 to 6) may use Table 1 above by reference.

Meanwhile, the special subframe may be any one of configurations shown in the following table.

TABLE 2

| Special subframe configuration | Normal CP (downlink) | | | Extended CP (downlink) | | |
|---|---|---|---|---|---|---|
| | | UpPTS | | | UpPTS | |
| | DwPTS | Normal CP (uplink) | Extended CP (uplink) | DwPTS | Normal CP (uplink) | Extended CP (uplink) |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In Table 2, $T_s$ has a relation of: $307200T_s=10$ ms (millisecond).

Figure 3:
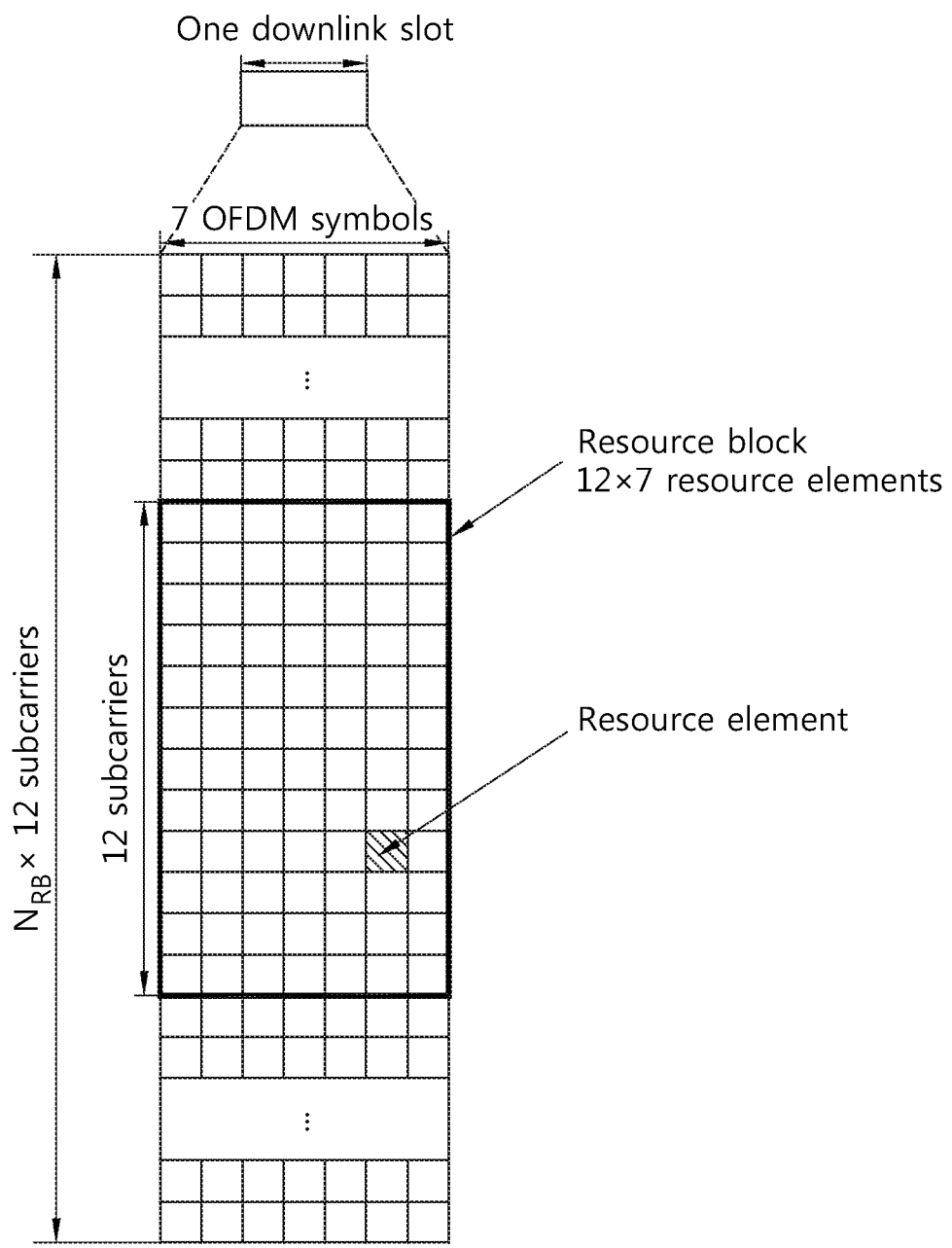
FIG. 3 shows an example of a resource grid for one downlink (DL) slot.

FIG. 3 shows an example of a resource grid for one DL slot.

Referring to FIG. 3, the DL slot includes a plurality of orthogonal frequency division multiplexing (OFDM) symbols in a time domain, and includes $N_{RB}$ resource blocks (RBs) in a frequency domain. The RB is a resource allocation unit, and includes one slot in the time domain and includes a plurality of subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described in FIG. 3 that one RB includes 7×12 REs consisting of 7 OFDM symbols in the time domain and 12 subcarriers in the frequency domain for example, the number of OFDM symbols and the number of subcarriers in the RB are not limited thereto. The number of OFDM symbols and the number of subcarriers may change variously depending on a cyclic prefix (CP) length, a frequency spacing, etc. The number of subcarriers in one OFDM symbol may be selected from 128, 256, 512, 1024, 1536, and 2048.

Figure 4:
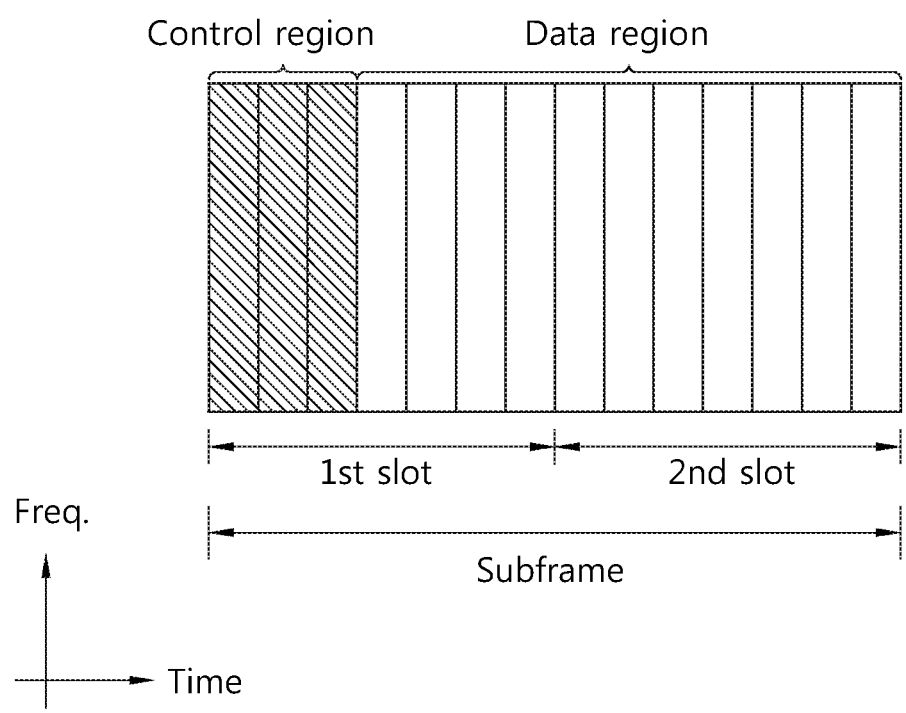
FIG. 4 shows a structure of a DL subframe.

FIG. 4 shows a structure of a DL subframe.

Referring to FIG. 4, the DL subframe is divided into a control region and a data region in the time domain. The control region includes up to first three (optionally, up to four) OFDM symbols of a 1$^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

A physical control format indicator channel (PCFICH) transmitted in a 1$^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

A physical hybrid-ARQ indicator channel (PHICH) carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a 2$^{nd}$ slot of a 1$^{st}$ subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

DCI formats transmitted on a PDCCH are described.

1. A DCI format 0 is used for PUSCH scheduling. 2. A DCI format 1 is used for one PDSCH codeword scheduling. 3. A DCI format 1A is used for compact scheduling of one PDSCH codeword or a random access process. 4. A DCI format 1B includes precoding information and is used for compact scheduling for one PDSCH codeword. 5. A DCI format 1C is used for very compact scheduling for one PDSCH codeword. 6. A DCI format 1D includes precoding and power offset information and is used for compact scheduling for one PDSCH codeword. 7. A DCI format 2 is used to designate a PDSCH for a close-loop MIMO operation. 8. A DCI format 2A is used to designate a PDSCH for an open-loop MIMO operation. 9. A DCI format 3 is used to transmit a transmit power control (TPC) command for a PUCCH and a PUSCH through 2-bit power regulation. A plurality of TPC commands may be included in the DCI format 3. 10. A DCI format 3A is used to transmit a TPC command for a PUCCH and a PUSCH through 1-bit power regulation. A plurality of TPC commands may be included in the DCI format 3A.

Figure 5:
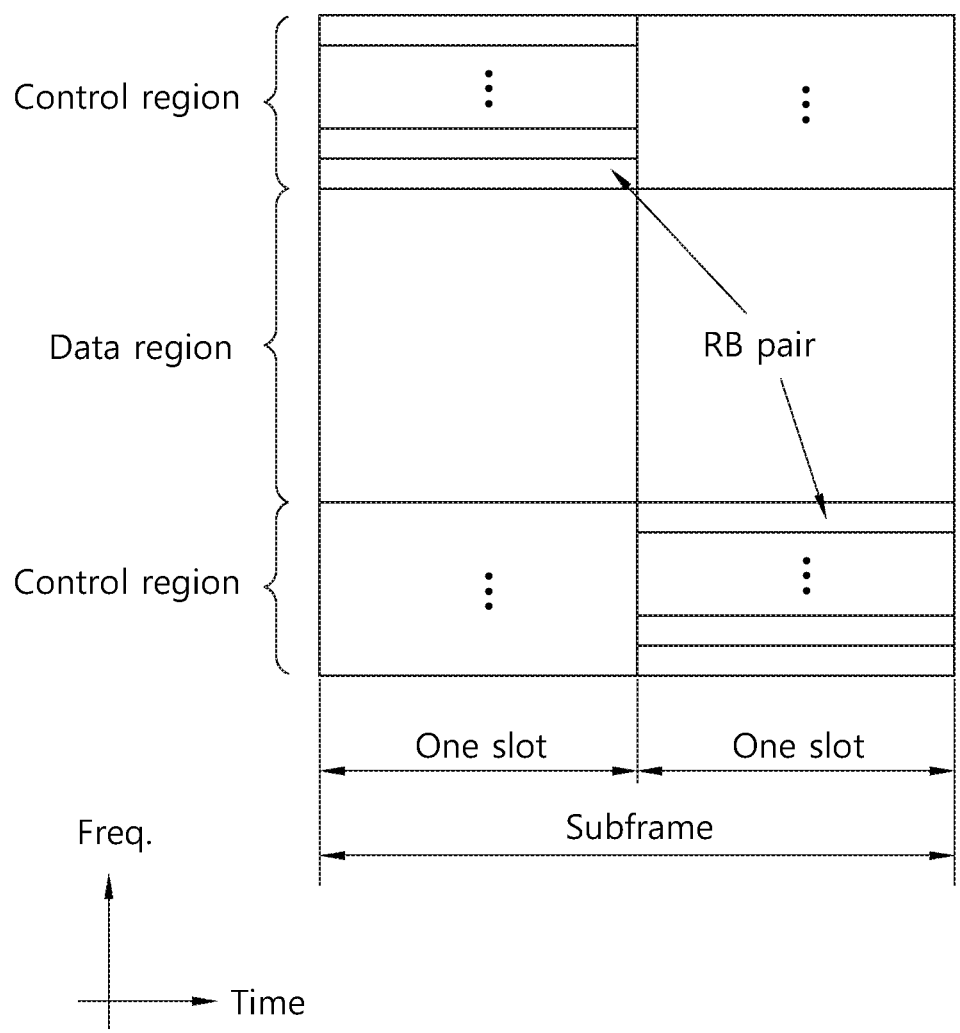
FIG. 5 shows a structure of an uplink (UL) subframe.

FIG. 5 shows a structure of a UL subframe.

Referring to FIG. 5, the UL subframe may be divided into a control region and a data region in a frequency domain. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a 1$^{st}$ slot and a 2$^{nd}$ slot. The RB pair has the same RB index m.

Meanwhile, the PUCCH supports multiple formats. A PUCCH having a different number of bits per subframe may be used according to a modulation scheme which is dependent on the PUCCH format.

Table 3 below shows an example of a modulation scheme and the number of bits per subframe according to the PUCCH format.

TABLE 3

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this case, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by the following equation.

$$r_u(n) = e^{jb(n)\pi/4}$$ [Equation 1]

Herein, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), 0 \leq I_{cs} \leq N-1$$ [Equation 2]

Herein, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Figure 6:
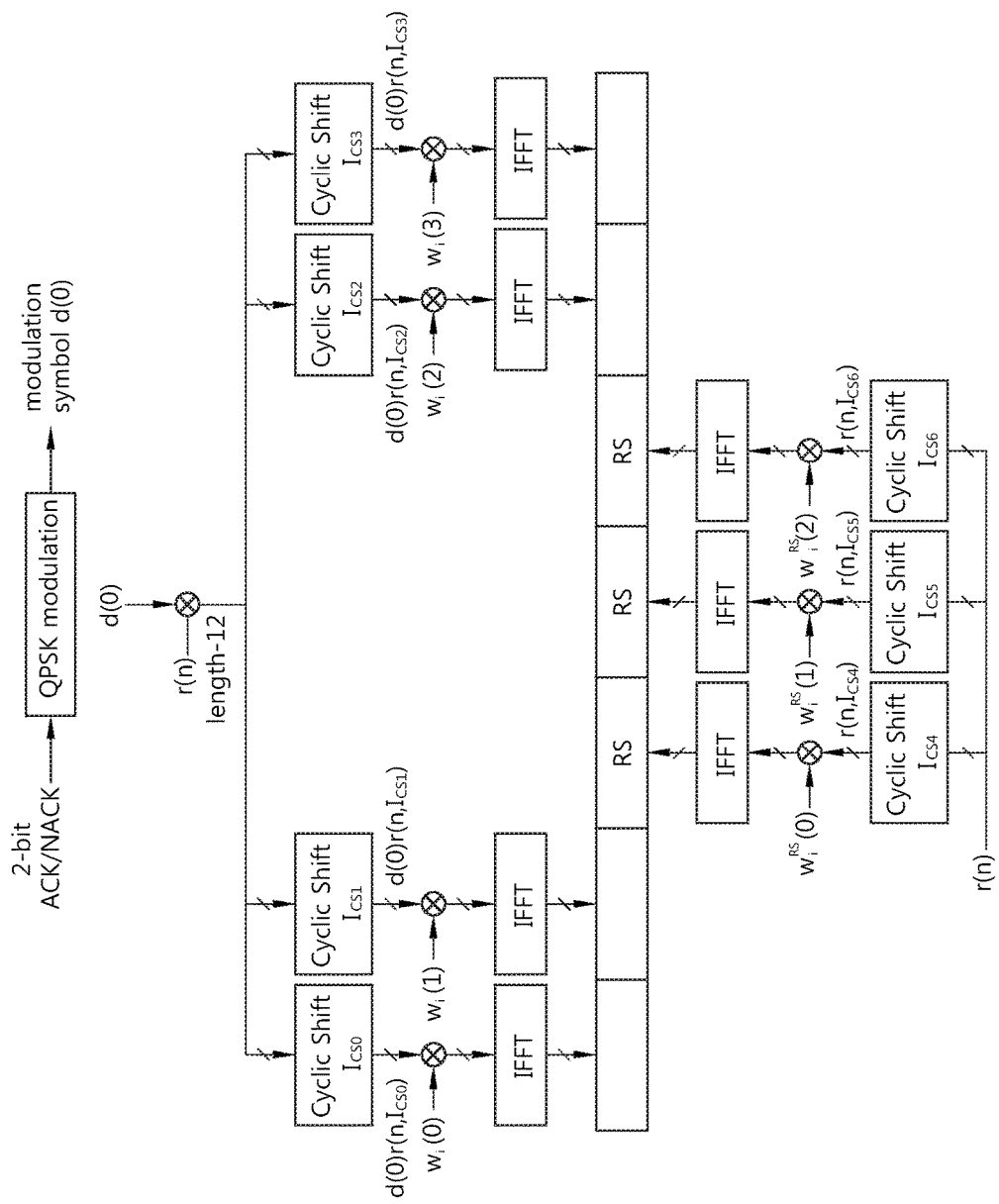
FIG. 6 shows a channel structure of a physical uplink control channel (PUCCH) format 1b in a normal cyclic prefix (CP) case.

FIG. 6 shows a channel structure of a PUCCH format 1b in a normal CP case.

One slot includes 7 OFDM symbols. Three OFDM symbols are reference signal (RS) OFDM symbols for an RS. Four OFDM symbols are data symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index 1 in a slot.

In the normal CP case, there are four data OFDM symbols for transmission of an ACK/NACK signal in one slot. Therefore, assume that CS indices corresponding to the respective data OFDM symbols are denoted by $I_{cs0}, I_{cs1}, I_{cs2}$, and $I_{cs3}$.

The modulation symbol d(0) is spread to a cyclically shifted sequence $r(n, I_{cs})$. When a one-dimensional spreading sequence corresponding to an $(i+1)^{th}$ OFDM symbol in a subframe is denoted by m(i), it can be expressed as follows.

$\{m(0), m(1), m(2), m(3)\} = \{d(0)r(n, I_{cs0}), d(0)r(n, I_{cs1}), d(0)r(n, I_{cs2}), d(0)r(n, I_{cs3})\}$

In order to increase UE capacity, the one-dimensional spreading sequence can be spread by using an orthogonal sequence. An orthogonal sequence $w_i(k)$ (where i is a sequence index, $0 \leq k \leq K-1$) having a spread factor K=4 uses the following sequence.

TABLE 4

| Index (i) | $[w_i(0), w_i(1), w_i(2), w_i(3)]$ |
| --- | --- |
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 5

| Index (i) | $[w_i(0), w_i(1), w_i(2)]$ |
| --- | --- |
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, two-dimensional spreading sequences $\{s(0), s(1), s(2), s(3)\}$ can be expressed as follows.

$\{s(0), s(1), s(2), s(3)\} = \{w_i(0)m(0), w_i(1)m(1), w_i(2)m(2), w_i(3)m(3)\}$

The two-dimensional spreading sequences $\{s(0), s(1), s(2), s(3)\}$ are subjected to inverse fast Fourier transform (IFFT) and thereafter are transmitted in corresponding OFDM symbols. Accordingly, an ACK/NACK signal is transmitted on a PUCCH.

A reference signal of the PUCCH format 1b is also transmitted by cyclically shifting the base sequence r(n) and then by spreading it by the use of an orthogonal sequence. When CS indices corresponding to three RS OFDM symbols are denoted by $I_{cs4}, I_{cs5}$, and $I_{cs6}$, three cyclically shifted sequences $r(n, I_{cs4}), r(n, I_{cs5})$, and $r(n, I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to construct the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUCCH}$ is defined in order for the UE to obtain the three parameters for constructing the PUCCH. The resource index $n^{(1)}_{PUCCH}$ is defined to $n_{CCE} + N^{(1)}_{PUCCH}$, where $n_{CCE}$ is an index of a first CCE used for transmission of a corresponding DCI (i.e., a DL resource allocation used to receive DL data corresponding to an ACK/NACK signal), and $N^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of a PUCCH resource or the ACK/NACK resource required to transmit the ACK/NACK signal on the PUCCH can be expressed with at least any one of an orthogonal sequence index i, a CS index $I_{cs}$, a resource block index m, and a PUCCH index $n^{(1)}_{PUCCH}$ for obtaining the three indices. The ACK/NACK resource may include at least any one of an orthogonal sequence, a cyclic shift, a resource block, and a combination thereof.

Figure 7:
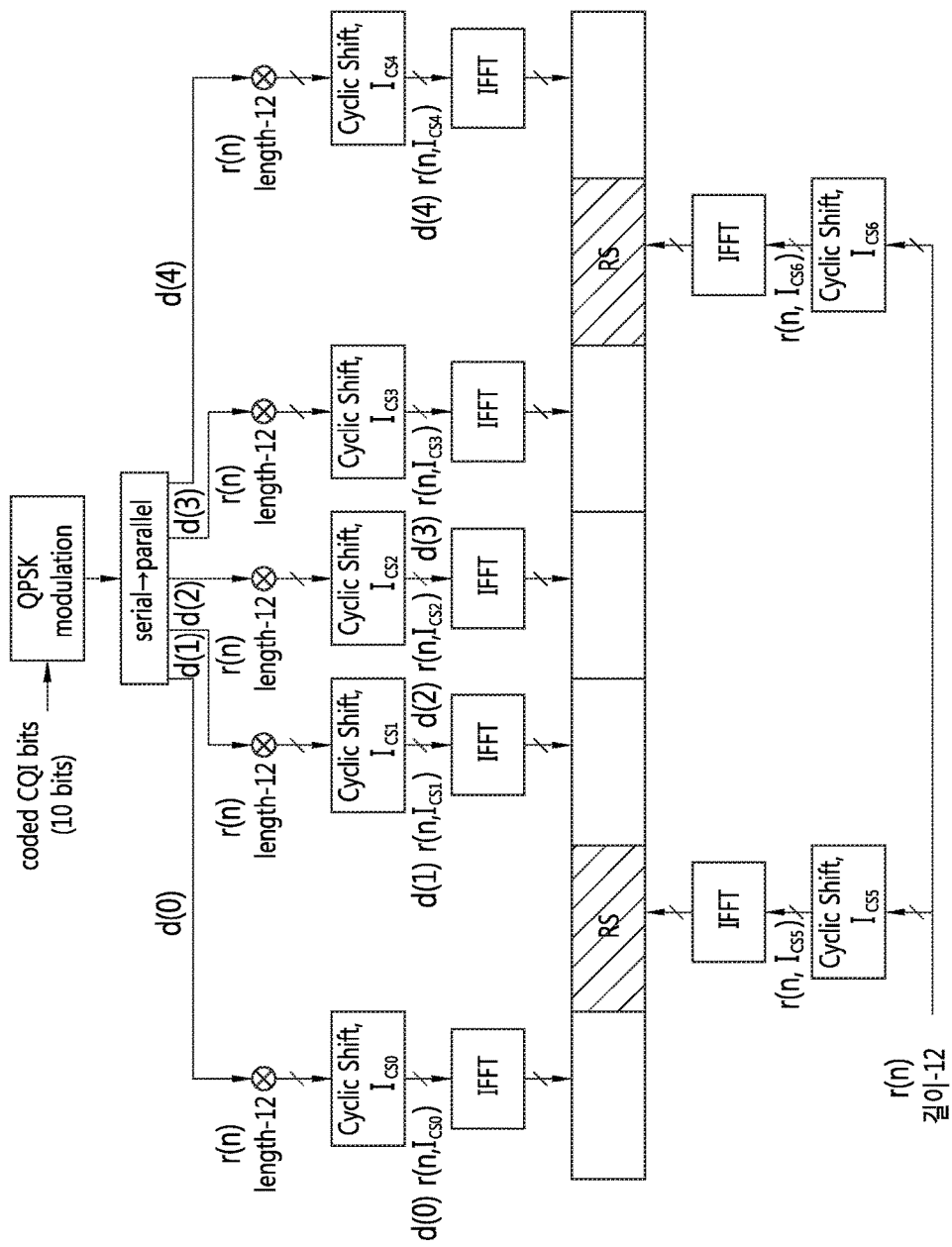
FIG. 7 shows a channel structure of PUCCH formats 2/2a/2b in a normal CP case.

FIG. 7 shows a channel structure of PUCCH formats 2/2a/2b in a normal CP case.

Referring to FIG. 7, in the normal CP case, OFDM symbols 1 and 5 (i.e., $2^{nd}$ and $6^{th}$ OFDM symbols) are used for a demodulation reference signal (DM RS) which is an uplink reference signal, and the remaining OFDM symbols are used for CQI transmission. In an extended CP case, an OFDM symbol 3 (i.e., a $4^{th}$ OFDM symbol) is used for a DM RS.

10 CQI information bits are channel coded, for example, with a coding rate of 1/2, to generate 20 coded bits. A Reed-Muller code can be used in the channel coding. After scheduling, QPSK constellation mapping is performed to generate QPSK modulation symbols (e.g., d(0) to d(4) in a slot 0). Each QPSK modulation symbol is subjected to IFFT after being modulated by using a cyclic shift of a base RS sequence having a length of 12, and is then transmitted in each of 10 SC-FDMA symbols in a subframe. 12 equally-spaced cyclic shifts allow 12 different UEs to be orthogonally multiplexed on the same PUCCH RB. A DM RS sequence applied to the ODMA symbols 1 and 5 may be the base RS sequence having the length of 12.

Meanwhile, in a carrier aggregation system or a TDD system, an amount of ACK/NACK to be transmitted in one uplink subframe may be greater than or equal to 2 bits. In this case, a PUCCH format 3 may be used.

Figure 8:
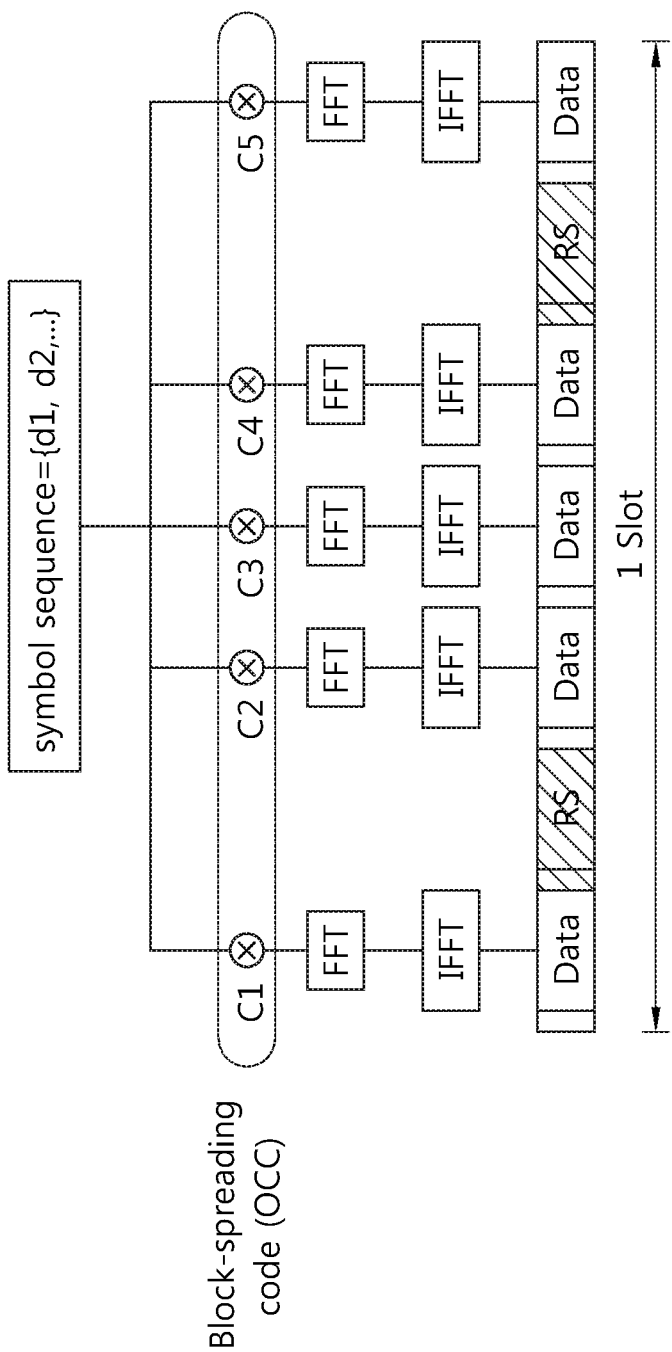
FIG. 8 shows a PUCCH format 3 based on block spreading.

FIG. 8 shows an example of a PUCCH format 3 based on block spreading.

Referring to FIG. 8, the PUCCH format 3 is a PUCCH format which uses a block spreading method. The block spreading method is a method of multiplexing a modulation symbol sequence modulated from multi-bit ACK/NACK by using a block spreading code. That is, the PUCCH format 3 is used when a symbol sequence (e.g., an ACK/NACK symbol sequence) is transmitted in a spreading manner in a time domain by the use of the block spreading code. An orthogonal cover code (OCC) may be used as the block spreading code. Control signals of several UEs may be multiplexed by the block spreading code. In the PUCCH format 2, one symbol sequence is transmitted in an overlapping manner in the time domain, and UE multiplexing is performed using cyclic shift of a constant amplitude zero auto-correlation (CAZAC) sequence, whereas in the PUCCH format 3, a symbol sequence (indicated by {d1, d2, ... }) consisting of one or more symbols is transmitted across a frequency domain of each data symbol (i.e., a symbol indicated by Data), and UE multiplexing is performed by spreading it in the time domain by the use of a block spreading code (indicated by C1, C2, C3, C4, C5). Although a case where two RS symbols (i.e., symbols indicated by RS) are used in one slot is shown in FIG. 8, the present invention is not limited thereto, and thus an OCC having a spreading factor of 4 may be used. An RS symbol may be generated from a CAZAC sequence having a specific cyclic shift, and may be transmitted in a format in which a specific OCC is multiplied by a plurality of RS symbols of the time domain.

Now, ACK/NACK transmission for HARQ in 3GPP LTE time division duplex (TDD) is described.

As described in a TDD frame, a DL subframe and a UL subframe coexist in the TDD frame. In general, the number of UL subframes is less than the number of DL subframes. Therefore, in preparation for a case where the UL subframes for transmitting an ACK/NACK signal are insufficient, it is supported that a plurality of ACK/NACK signals for a plurality of DL transport blocks received in a plurality of DL subframes are transmitted in one UL subframe.

According to the section 10.1 of 3GPP TS 36.213 V8.7.0 (2009-05), two ACK/NACK modes, i.e., ACK/NACK bundling and ACK/NACK multiplexing, are introduced.

The ACK/NACK bundling is an operation in which, if all of PDSCHs (i.e., DL transport blocks) received by a UE are successfully decoded, ACK is transmitted, and otherwise NACK is transmitted. For this, ACK or NACK for each PDSCH is compressed using an AND operation (i.e., a logical AND operation).

ACK/NACK multiplexing is also called ACK/NACK channel selection (or simply channel selection). When the ACK/NACK multiplexing is used, the UE transmits ACK/NACK by selecting one PUCCH resource among a plurality of PUCCH resources.

The following table shows a DL subframe n-k associated with a UL subframe n depending on the UL-DL configuration in 3GPP LTE. Herein, k∈K, and M is the number of elements of a set K.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3 for example. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$, $n^{(1)}_{PUCCH,3}$. In this case, an example of ACK/NACK channel selection is shown in the following table.

TABLE 7

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |

TABLE 7-continued

| HARQ-ACK(0), HARQ-ACK(1), HARQ-ACK(2) | $n^{(1)}_{PUCCH}$ | b(0), b(1) |
|---|---|---|
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the above table, HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected. In Table 7 above, there are three PUCCH resources $n^{(1)}_{PUCCH,0}$, $n^{(1)}_{PUCCH,1}$, and $n^{(1)}_{PUCCH,2}$, and b(0) and b(1) are 2 bits transmitted by using a selected PUCCH.

For example, if the UE successfully receives three DL transport blocks in three DL subframes, the UE transmits bits (1,1) through the PUCCH by performing QPSK modulation using $n^{(1)}_{PUCCH,2}$. If the UE fails to decode the DL transport block and successfully decodes the remaining transport blocks in a $1^{st}$ (i=0) DL subframe, the UE transmits bits (0, 1) through the PUCCH using $n^{(1)}_{PUCCH,2}$. That is, the conventional PUCCH format 1b can transmit only 2-bit ACK/NACK. However, channel selection is used to express more ACK/NACK states, by linking the allocated PUCCH resources and an actual ACK/NACK signal.

In ACK/NACK channel selection, NACK and DTX are coupled if at least one ACK exists. This is because a combination of a reserved PUCCH resource and a QPSK symbol is not enough to express all ACK/NACK states. However, if the ACK does not exist, the DTX and the NACK are decoupled.

In the aforementioned ACK/NACK bundling or channel selection, the total number of PDSCHs for which ACK/NACK is transmitted by the UE is important. If the UE fails to receive some of the plurality of PDCCHs for scheduling a plurality of PDSCHs, an error occurs in the total number of PDSCHs for which the ACK/NACK is transmitted, and thus ACK/NACK may be transmitted erroneously. To correct this error, a TDD system transmits the PDCCH by including a downlink assignment index (DAI). The DAI reports a counting value by counting the number of PDCCHs for scheduling the PDSCHs.

The aforementioned ACK/NACK bundling and ACK/NACK multiplexing may be applied when one serving cell is configured for the UE in TDD.

For example, it is assumed that one serving cell is configured (i.e., only a primary cell is configured) to the UE in TDD, ACK/NACK bundling or ACK/NACK multiplexing is used, and M=1. That is, it is assumed a case where one DL subframe is associated with one UL subframe.

1) In a case where the UE detects a PDSCH indicated by a corresponding PDCCH or a semi-persistent scheduling (SPS) release PDCCH in a subframe n-k of the primary cell, ACK/NACK is transmitted in a subframe n. In LTE, a BS may report to the UE about at which subframes semi-persistent transmission/reception is performed, by using a higher layer signal such as radio resource control (RRC). For example, a parameter given by the higher layer signal may be a subframe period and an offer value. The UE recognizes semi-persistent transmission through RRC signaling, and thereafter upon receiving an activation/release signal of SPS transmission through a PDCCH, performs or releases SPS PDSCH reception or SPS PUSCH transmission. That is, even if the UE is subjected to SPS scheduling through RRC signaling, if SPS transmission/reception is not immediately performed but an activation or release signal is received through a PDCCH, the SPS transmission/reception is performed in a subframe corresponding to a subframe period and an offset value allocated through RRC signaling by applying a frequency resource (i.e., a resource block) based on resource allocation designated in the PDCCH and a modulation and coding rate based on MCS information. In this case, a PDCCH for releasing SPS is called an SPS release PDCCH. In an LTE system, a DL SPS release PDCCH requires ACK/NACK signal transmission.

In this case, the UE transmits ACK/NACK in the subframe n by using the PUCCH formats 1a/1b based on the PUCCH resource $n^{(1,p)}_{PUCCH}$. In $n^{(1,p)}_{PUCCH}$, p indicates that it belongs to an antenna port p. k is determined by Table 6 above.

The PUCCH resource $n^{(1,p)}_{PUCCH}$ may be allocated as follows. p may be p0 or p1.

$$n^{(1,p=p0)}_{PUCCH}=(M-m-1)\cdot N_c+m\cdot N_{c+1}+n_{CCE}+ N^{(1)}_{PUCCH} \text{ for antenna port } p=p0$$

$$n^{(1,p=p1)}_{PUCCH}=(M-m-1)\cdot N_c+m\cdot N_{c+1}+(n_{CCE}+1)+ N^{(1)}_{PUCCH} \text{ for antenna port } p=p1 \quad [\text{Equation 3}]$$

In Equation 3, c is selected from $\{0,1,2,3\}$ to satisfy $N_c \le n_{CCE} < N_{c+1}$ (antenna port p0), $N_c \le (n_{CCE}+1) < N_{c+1}$ (antenna port p1). $N^{(1)}_{PUCCH}$ is a value determined by a higher layer signal. $N_C$ may be set to $N_C=\max\{0, \text{floor }[N^{DL}_{RB}\cdot(N^{RB}_{sc}\cdot c-4)/36]\}1$. $N^{DL}_{RB}$ is a DL bandwidth. $N^{RB}_{sc}$ is a size in a frequency domain of a resource block, and is indicated by the number of subcarriers. $n_{CCE}$ is a first CCE number used in transmission of a corresponding PDCCH in a subframe $n-k_m$. m is a value which allows $k_m$ to be a smallest value in the set K of Table 6 above.

2) If the UE detects an SPS PDSCH, that is, a PDSCH not having a corresponding PDCCH, in a DL subframe n-k of the primary cell, then ACK/NACK can be transmitted in a subframe n by using a PUCCH resource $n^{(1,p)}_{PUCCH}$ as described below.

Since the SPS PDSCH does not have a PDCCH for scheduling, the UE transmits ACK/NACK through the PUCCH formats 1a/1b based on $n^{(1,p)}_{PUCCH}$ determined by a higher layer signal. For example, four resources (i.e., a $1^{st}$ PUCCH resource, a $2^{nd}$ PUCCH resource, a $3^{rd}$ PUCCH resource, and a $4^{th}$ PUCCH resource) can be reserved by using an RRC signal, and one resource can be indicated by using a transmission power control (TPC) field of a PDCCH for activating SPS scheduling.

The following table shows an example of indicating a resource for channel selection according to the TPC field value.

TABLE 8

| TPC field value | Resource for channel selection |
|---|---|
| '00' | $1^{st}$ PUCCH resource |
| '01' | $2^{nd}$ PUCCH resource |
| '10' | $3^{rd}$ PUCCH resource |
| '11' | $4^{th}$ PUCCH resource |

For another example, it is assumed that one serving cell is configured (that is, only a primary cell is configured) for the UE in TDD, ACK/NACK multiplexing is used, and M>1. That is, it is assumed that a plurality of DL subframes is associated with one UL subframe.

1) If the UE receives a PDSCH in a subframe (0≤i≤M−1) or detects a DL SPS release PDCCH, a PUCCH resource $n^{(1)}_{PUCCH,i}$, for transmitting ACK/NACK may be allocated by the following equation. Herein, $k_i \in K$, and the set K is described above with reference to Table 6.

$$n^{(1)}_{PUCCH,i} = (M-i-1)\cdot N_c + i\cdot N_{c+1} + n_{CCE,i} N^{(1)}_{PUCCH} \quad \text{[Equation 4]}$$

Herein, c is selected from {0,1,2,3} to satisfy $N_c \leq n_{CCE,m} < N_{c+1}$. $N^{(1)}_{PUCCH}$ is a value determined by using a higher layer signal. $N_C$ may be max{0, floor $[N^{DL}_{RB} \cdot (N^{RB}_{sc} \cdot c - 4)/36]$}. $N^{DL}_{RB}$ is a downlink bandwidth, and $N^{RB}_{sc}$ is a size of a resource block indicated with the number of subcarriers in the frequency domain. $n_{CCE,m}$ is a 1$^{st}$ CCE number used in transmission of a corresponding PDCCH at a subframe $n-k_m$.

2) If the UE receives a PDSCH not having a corresponding PDCCH (i.e., an SPS PDSCH) in the subframe $n-k_i$, $n^{(1)}_{PUCCH,i}$ is determined according to a configuration given by a higher layer signal and according to Table 8.

If two or more serving cells are configured for the UE in TDD, the UE transmits ACK/NACK by using channel selection based on the PUCCH format 1b or by using the PUCCH format 3.

For example, in a case where a plurality of serving cells which use channel selection based on the PUCCH format 1b are configured, if an ACK/NACK bit is greater than 4 bits, the UE performs spatial ACK/NACK bundling for a plurality of codewords in one DL subframe, and transmits the bundled ACK/NACK bit for each serving cell through the channel selection based on the PUCCH format 1b. The spatial ACK/NACK bundling implies that ACK/NACK for each codeword is compressed through a logical AND operation in the same DL subframe.

If the ACK/NACK bit is less than or equal to 4 bits, the spatial ACK/NACK bundling is not used, and transmission is performed through the channel selection based on the PUCCH format 1b.

For another example, in a case where two or more serving cells using the PUCCH format 3 are configured for the UE, if the ACK/NACK bit is greater than 20 bits, the spatial ACK/NACK bundling is performed in each serving cell, and the ACK/NACK bit which is subjected to the spatial ACK/NACK bundling may be transmitted using the PUCCH format 3. If the ACK/NACK bit is less than or equal to 20 bits, the spatial ACK/NACK bundling is not used, and the ACK/NACK bit is transmitted using the PUCCH format 3.

Now, a carrier aggregation system will be described. The carrier aggregation system is also called a multiple carrier system.

A 3GPP LTE system supports a case where a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can correspond to one cell. Therefore, when a UE communicates with a BS through a plurality of DL CCs, it can be said that the UE receives a service from a plurality of serving cells.

Figure 9:
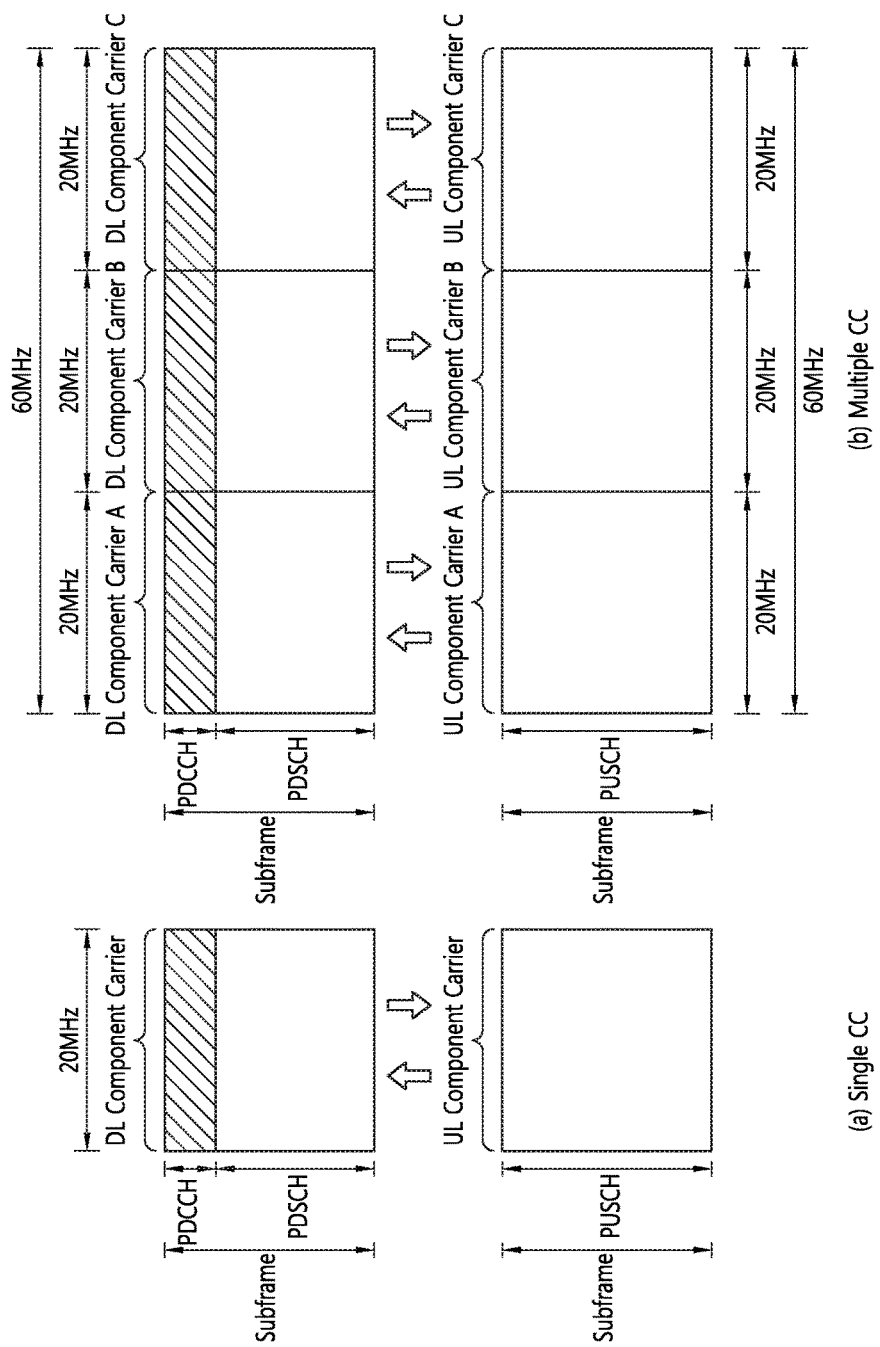
FIG. 9 shows an example of comparing a single carrier system and a carrier aggregation system.

FIG. 9 shows an example of comparing a single carrier system and a carrier aggregation system.

Although the carrier aggregation system (see FIG. 9(b)) has three DL CCs and three UL CCs, the number of DL CCs and the number of UL CCs are not limited thereto. A PDCCH and a PDSCH may be independently transmitted in each DL CC. A PUCCH and a PUSCH may be independently transmitted in each UL CC. Alternatively, the PUCCH may be transmitted only through a specific UL CC.

Since three DL CC-UL CC pairs are defined, it can be said that a UE receives a service from three serving cells.

The UE may monitor the PDCCH in a plurality of DL CCs, and may receive a DL transport block simultaneously via the plurality of DL CCs. The UE may transmit a plurality of UL transport blocks simultaneously via a plurality of UL CCs.

A pair of a DL CC #1 and a UL CC #1 may be a 1$^{st}$ serving cell, a pair of a DL CC #2 and a UL CC #2 may be a 2$^{nd}$ serving cell, and a DL CC #3 may be a 3$^{rd}$ serving cell. Each serving cell may be identified by using a cell index (CI). The CI may be cell-specific or UE-specific.

The serving cell may be classified into a primary cell and a secondary cell. The primary cell is a cell designated as the primary cell when the UE performs an initial network entry process or starts a network re-entry process or performs a handover process. The primary cell is also called a reference cell. The secondary cell may be configured after an RRC connection is established, and may be used to provide an additional radio resource. At least one primary cell is configured always. The secondary cell may be added/modified/released by using higher-layer signaling (e.g., RRC messages). The CI of the primary cell may be fixed. For example, a lowest CI may be designated as a CI of the primary cell.

The carrier aggregation system may support cross-carrier scheduling. The cross-carrier scheduling is a scheduling method capable of performing resource allocation of a PDSCH transmitted by using a different CC through a PDCCH transmitted via a specific CC and/or resource allocation of a PUSCH transmitted via another CC other than a CC basically linked to the specific CC. That is, the PDCCH and the PDSCH may be transmitted through different DL CCs, and the PUSCH may be transmitted through a different UL CC other than a UL CC basically linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF). Hereinafter, a scheduling carrier or a scheduling cell implies a carrier or serving cell for transmitting a UL grant or a DL grant, and a scheduled carrier or a scheduled cell implies a carrier or serving cell for receiving or transmitting a data channel by using the UL grant or the DL grant.

Non-cross carrier scheduling is a scheduling method extended from the conventional scheduling method. That is, it is a scheduling method in which a PDSCH and a PDCCH for scheduling the PDSCH are transmitted in the same DL CC. In addition, it is a scheduling method in which a PDCCH for scheduling a PUSCH is transmitted in a DL CC and a PUSCH is transmitted in a UL CC basically linked to the DL CC.

Now, the present invention is described.

Machine type communication (MTC), multi-user multi-input multi-output (MU-MIMO), and carrier aggregation between TDD cells using different UL-DL configurations, aggregation between cells having different frame structures (e.g., a TDD frame and an FDD frame), aggregation between a legacy carrier and a new carrier type (NCT), aggregation between a macro cell and a small cell, etc., may be used in a next generation wireless communication system. Further, the number of simultaneously scheduled UEs may be increased.

Although aggregation may be achieved between cells provided by the same BS existing at a specific location in such a system, aggregation may also be achieved between cells provided by different BSs existing at different locations. In the latter case, scheduling for each BS may be performed due to a control information delay between the BSs.

In addition, unlike the conventional system in which transmission of a PUCCH as an uplink control channel is limited only to a primary cell, a future system can transmit the PUCCH not only in the primary cell but also in a secondary cell. In this case, the secondary cell capable of transmitting the PUCCH may be designated such that only one cell is allowed for each cell group, or may be specified through signaling. The cell group may be determined according to a predetermined rule. The rule may be determined according to a delay time between BSs. Cells capable of ignoring the delay time may be determined as the same cell group, and cells which need to consider the delay time may be determined as different cell groups. Alternatively, the cell group may be determined explicitly through an RRC message.

Hereinafter, for a case where the transmission of the PUCCH is also allowed in the secondary cell without being limited to the primary cell, a method of controlling transmission power of each channel (e.g., PUCCH, PUSCH) and how to perform other various configurations, etc., will be described hereinafter.

<PUCCH Power Control>

In the conventional wireless communication system, a PUCCH is transmitted only on a primary cell. Therefore, transmission power control of the PUCCH is defined mainly based on the primary cell. However, in a future wireless communication system, PUCCH transmission may also be possible in a secondary cell in addition to the primary cell. In particular, if the primary cell is a macro cell and the secondary cell is a small cell, an optimal transmission power amount and characteristic may vary for each cell. Herein, the macro cell may be the legacy BS, and may be a device which uses higher power than the small cell. The small cell may be a low-power device which is arranged inside/outside a coverage of the legacy BS. In this case, how to control/determine the PUCCH transmission power is a matter to be considered.

Figure 10:
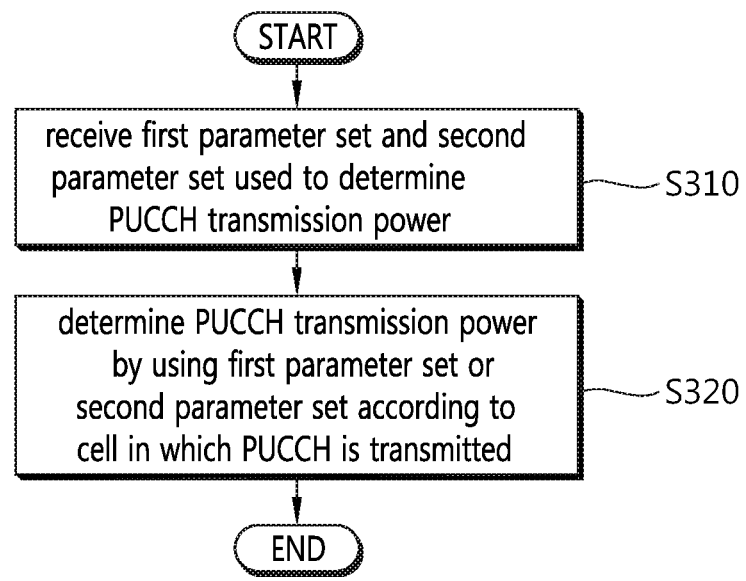
FIG. 10 shows a PUCCH power control method according to an embodiment of the present invention.

FIG. 10 shows a PUCCH power control method according to an embodiment of the present invention.

A UE receives from a BS a first parameter set and a second parameter set which are used to determine PUCCH transmission power (step S310). The first parameter set may be a set of parameters used to determine the PUCCH transmission power when a PUCCH is transmitted through only a primary cell. The second parameter set may be a set of parameters used to determine the PUCCH transmission power when the PUCCH is transmitted only through a secondary cell. The secondary parameter set may be a set of parameters for determining the PUCCH transmission power when the PUCCH is transmitted through both of the primary cell and the secondary cell. Parameters included in the second parameter set may be the same as or a part of parameters of the first parameter set, and optionally may include additional parameters not included in the first parameter set.

The UE determines the PUCCH transmission power by using the first parameter set or the second parameter set according to a cell in which the PUCCH is transmitted (step S320).

For example, if the PUCCH is transmitted only in the primary cell, the PUCCH transmission power is determined by using the first parameter set. If the PUCCH can be transmitted in both of the primary cell and the secondary cell, the UE may use the first parameter set to determine PUCCH transmission power transmitted in the primary cell and the second parameter set to determine PUCCH transmission power transmitted in the secondary cell. Alternatively, if the PUCCH can be transmitted in both of the primary cell and the secondary cell, the PUCCH transmission power of both of the primary cell and the secondary cell may be determined by using the second parameter set.

Now, the PUCCH power control method described with reference to FIG. 10 is described in greater detail.

First, a method of determining transmission power of the PUCCH is described when the PUCCH is transmitted only in the primary cell. If the transmission power of the PUCCH transmitted in a subframe i is denoted by $P_{PUCCH}(i)$, $P_{PUCCH}(i)$ may be determined as follows.

[Equation 5]
$$P_{PUCCH}(i) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}$$

As shown in Equation 5 above, various parameters are required to determine the PUCCH transmission power. If the PUCCH is transmitted only in the primary cell, the parameters required to determine the PUCCH transmission power may be called a first parameter set.

In Equation 5 above, $P_{CMAX,c}(i)$ is maximum transmission power assigned to a UE at a subframe i of a serving cell c, and is determined by the UE on the basis of a parameter received from a BS or a UE-specific parameter.

$\Delta_{F\_PUCCH}(F)$ is provided by a higher layer, and a value of $\Delta_{F\_PUCCH}(F)$ corresponds to a PUCCH format (F). $\Delta_{TxD}(F')$ is a value given by the higher layer when the UE is configured to transmit the PUCCH through two antenna ports by the higher layer. $\Delta_{TxD}(F')$ plays a role of providing a power offset value for each PUCCH format when a TxD is used in PUCCH transmission.

$P_{O\_PUCCH}$ is a value given by the higher layer, and g(i) is a current PUCCH power control adjustment state. $PL_c$ is a value for a path loss.

$h(n_{CQI}, n_{HARQ}, n_{SR})$ is a value depending on a PUCCH format. $n_{CQI}$ corresponds to the number of CQI information bits. $n_{SR}$ is 1 if SR is set in a subframe i, and otherwise 0. If two or more serving cells are configured for the UE, or one serving cell is configured and is transmitted using a PUCCH format 3, in case of FDD, $n_{HARQ}$ is the total number of SPS release PDCCHs/EPDCCHs or the number of transport blocks received in a subframe n−4 (when a subframe for transmitting ACK/NACK is a subframe n) of each configured cell. In case of TDD, it may be determined on the basis of the total number of release PDCCHs or the number of transport blocks received in a subframe n−k corresponding to a subframe n in each configured cell. Alternatively, in case of TDD, it may be determined on the basis of the total number of PDSCHs without a corresponding PDSCCH/EPDCCH or the number of PDCCHs/EPDCCHs received in a subframe n-k corresponding to a subframe n in each configured cell. In other cases, it indicates the number of HARQ bits transmitted in a subframe i.

Meanwhile, if the PUCCH can be transmitted also in the secondary cell, Equation 5 above may be changed as described below by using parameters included in the second parameter set. The parameters included in the second parameter set may be respective parameters of Equation 5.

In Equation 5, $P_{O\_PUCCH}$ is determined by a sum of $P_{O\_NOMINAL\_PUCCH}$ and $P_{O\_UE\_PUCCH}$. Herein, a possible case is as follows: 1) regarding the two parameters $P_{O\_NOMINAL\_PUCCH}$ and $P_{O\_UE\_PUCCH}$, the same value used in the primary cell may also be used in the secondary cell; or 2) $P_{O\_NOMINAL\_PUCCH,c}$ which is $P_{O\_NOMINAL\_PUCCH}$ for a cell c may be set for each cell, and $P_{O\_UE\_PUCCH}$ may be set to a common value for cells (i.e., the primary cell and the secondary cell) configured for the UE; or 3) $P_{O\_NOMINAL\_PUCCH}$ may be set to a common value for all cells configured for the UE, and $P_{O\_UE\_PUCCH,c}$ may be set for each cell configured for the UE; or 4) both of $P_{O\_NOMINAL\_PUCCH,c}$ and $P_{O\_UE\_PUCCH,c}$ may be set for each cell. In the aforementioned cases 1) to 4), a value used for each cell may be commonly set for a specific secondary cell group or all secondary cells.

If the PUCCH is transmitted only in the primary cell, c=0 in $PL_c$. If the PUCCH can be transmitted also in the secondary cell, $PL_c$ may be a path loss of a downlink cell matched in a cell-specific manner to an uplink cell of the secondary cell, and a downlink cell may be indicated by a system information block-2 (SIB-2) or may be predetermined. Alternatively, $PL_c$ may be a path loss of a downlink cell matched in a UE-specific manner to an uplink cell of the secondary cell. That is, the path loss of the downlink cell matched to the uplink cell may be indicated through UE-specific RRC signaling.

If it is configured such that a specific cell includes only an uplink subframe without a downlink subframe or such that the specific cell is used by a UE by being aggregated only in an uplink, a BS may report a specific downlink cell to which $PL_c$ belongs.

$h(n_{CQI}, n_{HARQ}, n_{SR})$ is a parameter determined on the basis of an information amount of UCI transmitted on a PUCCH. $h(n_{CQI}, n_{HARQ}, n_{SR})$ may be determined according to the information amount of UCI transmitted on the PUCCH for each cell. For a cell c, if $n_{CQI}$ is denoted by $n_{CQI,c}$, $n_{HARQ}$ is denoted by $n_{HARQ,c}$, and $n_{SR}$ is denoted by $n_{SR,c}$, then $h(n_{CQI,c}, n_{HARQ,c}, n_{SR,c})$ may be provided in the second parameter set.

$\Delta_{F\_PUCCH}(F)$ is provided by a higher layer, and a value of $\Delta_{F\_PUCCH}(F)$ corresponds to a PUCCH format (F). $\Delta_{F\_PUCCH}(F)$ may be applied as follows: 1) while maintaining a previous value determined for each PUCCH format, a common value may be applied to all cells configured for a UE; or 2) a configuration of a value for each PUCCH format may vary depending on a cell characteristic. A value used for each cell may be commonly set for a specific secondary cell group or for all secondary cells.

$\Delta_{TxD}(F')$ is a value given by the higher layer when the UE is configured to transmit the PUCCH through two antenna ports by the higher layer. In the conventional method, a PUCCH TxD configuration is determined for each PUCCH format. That is, according to $\Delta_{TxD}(F')$ included in the first parameter set, whether to apply a power offset for a TxD is determined for each PUCCH format. $\Delta_{TxD}(F)$ included in the second parameter set may be configured as follows: 1) the PUCCH TxD is commonly configured in all cells for each PUCCH format, or 2) the PUCCH TxD is configured separately in each cell for each PUCCH format. The TxD may be commonly configured for a specific secondary cell group or all secondary cells.

g(i) is a value accumulated according to a TPC. g(i) included in the second parameter set may be applied as follows. 1) A TPC value may be commonly applied to all cells. That is, a common summation may be achieved. Even if $P_{O\_UE\_PUCCH,c}$ of a specific cell is changed, g(0)=0 when it is changed by a higher layer. 2) Alternatively, a TPC value transmitted through a PDCCH for scheduling a downlink cell which is a target of UCI transmitted through the PUCCH may be applied separately to each cell. That is, a separate summation may be achieved. A value used for each cell may be commonly set for a specific secondary cell group or all secondary cells.

If a value of $P_{O\_UE\_PUCCH}$ included in the first parameter set is changed by a higher layer, g(0)=0. In the second parameter set, a possible case is as follows: 1) if $P_{O\_UE\_PUCCH}$ is commonly applied to all cells, it may be set to $g_c(0)=0$; or 2) if $P_{O\_UE\_PUCCH}$ is applied to each cell, it may be set to $g_c(0)=0$ only for a cell corresponding to the changed $P_{O\_UE\_PUCCH,c}$; or 3) if $P_{O\_UE\_PUCCH}$ is applied to each cell, it may be set to $g_c(0)=0$ not only for a cell corresponding to the changed $P_{O\_UE\_PUCCH,c}$ but also for all cells; or 4) if $P_{O\_UE\_PUCCH,c}$ is applied to each cell, it may be set to $g_c(0)=0$ for all secondary cells or all secondary cell groups when the changed $P_{O\_UE\_PUCCH,c}$ corresponds to a secondary cell or a specific cell group.

Meanwhile, if $P_{O\_UE\_PUCCH}$ is not changed by the higher layer in the first parameter set, it may be set to $g(0)=\Delta P_{rampup}+\delta_{msg2}$. $\delta_{msg2}$ is a TPC indicated in a random access response, and $\Delta P_{rampup}$ is a total power ramp-up from first to last preambles provided by the higher layer. In the second parameter set, the following case is possible. 1) $\Delta P_{rampup,c}$ may be set for each cell, and $\delta_{msg2,c}$ may also be set for each cell. This may be applied only to a cell for transmitting a physical random access channel (PRACH), or may be applied to PUCCH transmission cells included in a cell group to which the cell for transmitting the PRACH belongs. An uplink cell which receives a command through a PDCCH to transmit the PRACH for initialization of PUCCH transmission power may be determined to the PUCCH transmission cell. It may be applied to a primary cell and all of secondary cells, or may be applied limitedly only to a secondary cell group.

2) Alternatively, $\Delta P_{rampup}$ may be commonly set for all cells, and $\delta_{msg2,c}$ may be set for each cell. In this case, it may be applied only to a cell for transmitting a PRACH, or may be applied to PUCCH transmission cells in a cell group to which the cell for transmitting the PRACH belongs. 3) Alternatively, $\Delta P_{rampup,c}$ may be set for each cell, and $\delta_{msg2}$ may be commonly set for all cells. 4) Alternatively, $\Delta P_{rampup}$ may be commonly set for all cells, and $\delta_{msg2}$ may also commonly set for all cells.

In case of a TPC command, the following method may be used for transmission. This method may be applied to all cells or to only secondary cells other than a primary cell, or may be applied limitedly to a secondary cell group other than a primary cell group.

1) When aggregating a specific cell, it may be configured such that a TPC is applied in reception using only a DCI format 3/3A. This may be limitedly applied only in PUCCH transmission corresponding to a specific cell group. For example, PUCCH transmission corresponding to the primary cell group may conform to the conventional method, and this may be applied only to the remaining cell groups other than the primary cell group. That is, in case of a PUCCH transmitted in the secondary cell, the TPC may be received with only the DCI format 3/3A.

In this case, all TPC fields may be used as an ARI. Therefore, it is possible to avoid a situation in which a fallback to an implicit PUCCH format 1a/1b or an explicit PUCCH format 1a/1b for an SPS response must be achieved when the ARI is not present and thus an explicit PUCCH format 3 resource cannot be selected or an explicit PUCCH format 1b resource for channel selection cannot be selected.

The fallback to the PUCCH format 1a/1b may not be supported. That is, the explicit PUCCH format 3 may be always used as the ARI, or channel selection using the PUCCH format 1b may be always used.

In a case where the PUCCH format 1a/1b fallback is supported, it may be applied for single scheduling in all cells only when resources can be identified between cells.

2) A TPC field of all PDCCHs may be used as the TPC. In this case, it is difficult to transmit an ARI. Therefore, an explicit PUCCH resource is used by allocating one fixed RRC resource without having to use the ARI.

3) Alternatively, the TPC may be used with DAI=1 by designating only one cell for each cell group.

Hereinafter, power control of a PUSCH and an SRS is described when a PUCCH can be transmitted also in a secondary cell.

<PUSCH/SRS Power Control>

In the conventional system, unlike a PUCCH, a PUSCH/SRS can also be transmitted in all activated secondary cells which are aggregated. Therefore, power control is performed for each cell.

1) If only the PUSCH is transmitted without the PUCCH, the power control may be performed by the following equation.

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \quad \text{[Equation 6]}$$

2) If the PUCCH and the PUSCH are transmitted simultaneously, the power control may be performed by the following equation.

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \quad \text{[Equation 7]}$$

Hereinafter, a method of determining transmission power of a PUSCH is described according to the present invention.

First, if a plurality of PUCCHs are transmitted, the following rule may be applied.

A remainder obtained by subtracting the total PUCCH transmission power from $P_{Cmax}$ allowed to a UE may be allocated to a PUSCH. Regarding transmission power between PUSCHs, transmission power of a PUSCH which transmits UCI may be first subtracted and thereafter transmission power may be allocated to a PUSCH which does not transmit the UCI. This is expressed by the following equation.

$$\sum_{c \in configuredCell} w(i)\hat{P}_{PUSCH,c}(i) < \quad \text{[Equation 8]}$$
$$\hat{P}_{CMAX}(i) - \sum_{c \in configuredCell} \hat{P}_{PUCCH,c}(i)$$

That is, the remaining UE power other than the PUCCH transmission power is allocated to the PUSCH transmission power.

If a plurality of PUCCHs are transmitted in one cell, the PUSCH transmission power may be determined by the following equation.

$$P_{PUSCH,c}(i) = \min \left\{ \begin{array}{l} 10\log_{10}\left(\hat{P}_{CMAX,c}(i) - \sum_{c \in configuredCell} \hat{P}_{PUCCH,c}(i)\right), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \quad \text{[Equation 9]}$$

Figure 11:
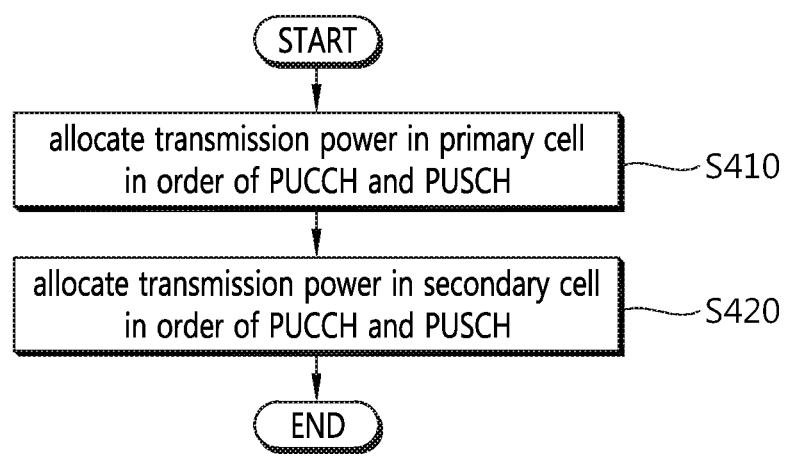
FIG. 11 shows an example of a method of determining PUSCH transmission power when a PUCCH can be transmitted also in a secondary cell.

FIG. 11 shows an example of a method of determining PUSCH transmission power when a PUCCH can be transmitted also in a secondary cell.

Referring to FIG. 11, a UE allocates transmission power in a primary cell in order of 1) PUCCH and 2) PUSCH (step S410). Thereafter, the UE allocates transmission power in the secondary cell in order of 1) PUCCH and 2) PUSCH.

In the primary cell or a primary cell group, transmission power may be allocated in order of a PUCCH, a PUSCH for transmitting UCI, and other PUSCHs. Thereafter, in the remaining secondary cells or a secondary cell group, transmission power may be allocated in order of a PUCCH and a PUSCH.

If a group index capable of identifying a cell group is allocated, a lowest group index may be allocated to the primary cell group, and next group indices may be allocated to the secondary cell group. In this case, transmission power may be first allocated to a cell group having the lowest group index, and thereafter transmission power may be allocated in sequence to a cell group having a high group index. The conventional transmission power allocation method may be applied between cells included in one group.

In addition, cell parameters such as $P_{O\_PUSCH,c}(j)$, $\alpha_c(j)$, etc., applied to each cell may be commonly applied to a cell group. The parameters may be commonly set for a specific secondary cell group or for all secondary cells.

$P_{O\_PUSCH,c}(j)$ is determined by a sum of $P_{O\_NOMINAL\_PUSCH,c}(j)$ and $P_{O\_UE\_PUSCH,c}(j)$. Conventionally, $P_{O\_NOMINAL\_PUSCH,c}(j)$ and $P_{O\_UE\_PUSCH,c}(j)$ are set for each cell. In the present invention, as to $P_{O\_NOMINAL\_PUSCH,c}(j)$ and $P_{O\_UE\_PUSCH,c}(j)$, a value used for each cell may be commonly set for a specific secondary cell group or all secondary cells. As to a cell group to which the common value is applied, the same value as that used in the primary cell may be applied.

As to $\alpha_c(j)$, a value used for each cell may be commonly set for a specific secondary cell group or for all secondary cells. As to a cell group to which the common value is applied, the same value as that used in the primary cell may be applied.

The following description is about various configuration changes that can be considered by a BS in a system in which a PUCCH can be transmitted also in the secondary cell.

<SRS Configuration>

In the conventional wireless communication system, an SRS configuration is performed for each cell. However, in consideration of a case where a secondary cell is replaced frequently, a method of commonly setting a value used for each cell may be used for a secondary cell group or all secondary cells. As to a cell group to which the common value is applied, the same value as that used in the primary cell may be applied.

<Transmission Mode Configuration>

In the conventional wireless communication system, a transmission mode (TM) is configured separately for each cell. However, in consideration of a case where a secondary cell is replaced frequently, a method of commonly setting a value used for each cell may be used for a secondary cell group or all secondary cells. As to a cell group to which the common value is applied, the same value as that used in the primary cell may be applied.

<CSI Reporting Mode Configuration>

In the conventional wireless communication system, a CSI reporting mode is configured separately for each cell. However, in consideration of a case where a secondary cell is replaced frequently, a method of commonly setting a value used for each cell may be used for a secondary cell group or all secondary cells. As to a cell group to which the common value is applied, the same value as that used in the primary cell may be applied.

<TDD UL/DL Configuration, Special Subframe Configuration>

Conventionally, a TDD UL/DL and a special subframe are configured separately for each cell. However, in consideration of a case where a secondary cell is replaced frequently, a method of commonly setting a value used for each cell may be used for a secondary cell group or all secondary cells. As to a cell group to which the common value is applied, the same value as that used in the primary cell may be applied.

<PUCCH Resource Index Offset>

Conventionally, $N^{(1)}_{PUCCH}$ which is a start position of an implicit PUCCH resource index is configured separately for each cell. However, in consideration of a case where a secondary cell is replaced frequently, a method of commonly setting a value used for each cell may be used for a secondary cell group or all secondary cells. As to a cell group to which the common value is applied, the same value as that used in the primary cell may be applied.

<SRS Configuration>

In the conventional wireless communication system, a DL/UL semi-persistent scheduling (SPS) configuration is possible only in a primary cell. However, in consideration of a case where carrier aggregation is introduced between BSs located in different regions and a secondary cell is frequently replaced, a plurality of SPS configurations may be preferably allowed.

In this case, only one SPS configuration on the secondary cell other than the primary cell may be allowed for each secondary cell group or for all secondary cells. Further, regarding a configuration of an SPS period, a method of commonly setting a value used for each cell is preferably applied to the secondary cell group or all of the secondary cells. The same value as that used for the primary cell may be applied as the common value.

<PUCCH TxD Configuration>

In the conventional wireless communication system, a PUCCH TxD is configured for each PUCCH format. The TxD configuration based thereon may be applied as follows.

1. A method of commonly configuring a PUCCH TxD in all cells for each PUCCH format. For example, a PUCCH TxD configuration of a primary cell, may also be applied to other secondary cells.

2. A method of configuring a PUCCH TxD separately in each cell for each PUCCH format.

It is allowed to perform suitable transmission according to each uplink cell coverage, geometry environment, available PUCCH resource, etc.

3. A method of commonly configuring a TxD may be used for a specific secondary cell group or all secondary cells. A specific configuration is commonly applied to actively cope with a frequent change of the secondary cell.

4. Only the primary cell may allow a TxD configuration only for a PUCCH. In case of the secondary cell, the TxD may be restrictively used since a geometry environment may be better than that of a macro BS.

<Configuration of ACK/NACK and CSI Simultaneous Transmission Mode>

In the conventional wireless communication system, a configuration of an ACK/NACK and CSI simultaneously transmission mode is necessary only in a primary cell. However, the following may be applied in the present invention.

1. The ACK/NACK and CSI simultaneous transmission mode may be commonly set for all cells. In this case, a configuration of all cells may conform to a configuration of the primary cell.

2. The ACK/NACK and CSI simultaneous transmission mode may be set separately for each cell. It is allowed to perform suitable transmission according to each uplink cell coverage, geometry environment, available PUCCH resource, etc.

3. A method of commonly setting the ACK/NACK and CSI simultaneous transmission mode may be used for a specific secondary cell group or all secondary cells. A specific configuration is commonly applied to actively cope with a frequent change of the secondary cell.

4. A PUCCH may be transmitted only in the primary cell, and a configuration of the ACK/NACK and CSI simultaneous transmission mode may be allowed.

<Configuration of PUCCH and PUSCH Simultaneous Transmission>

Conventionally, PUCCH and PUSCH simultaneous transmission is possible only in a primary cell, and thus a configuration of the PUCCH and PUSCH simultaneous transmission is required only in the primary cell. However, in a future wireless communication system, the PUCCH and PUSCH simultaneous transmission may be possible also in a secondary cell. When considering this, the following method may be applied in carrier aggregation.

1. A PUCCH and PUSCH simultaneous transmission mode (hereinafter, also referred to as a simultaneous transmission mode) may be commonly configured for all cells. In this case, a configuration of a simultaneous transmission mode of secondary cells may conform to a configuration of a simultaneous transmission mode of the primary cell. That is, if the PUCCH and PUSCH simultaneous transmission is allowed in the primary cell, it is configured such that the PUCCH and PUSCH simultaneous transmission is also allowed in the secondary cell. On the other hand, if the PUCCH and PUSCH simultaneous transmission is not allowed in the primary cell, it is configured such that the PUCCH and PUSCH simultaneous transmission is not allowed in the secondary cell.

2. The PUCCH and PUSCH simultaneous transmission mode may be configured independently for each cell. It is allowed to perform suitable transmission according to each uplink cell coverage, geometry environment, available PUCCH resource, etc.

3. The PUCCH and PUSCH simultaneous transmission mode may be commonly configured for a specific secondary cell group or all secondary cells. A value used for each cell may be commonly set for a specific secondary cell group or for all secondary cells.

4. The configuration of the PUCCH and PUSCH simultaneous transmission mode may be allowed only in the primary cell.

<Configuration for a Case where ACK/NACK Repetition is Allowed in Carrier Aggregation Situation>

Conventionally, a configuration of ACK/NACK repetition is not allowed in carrier aggregation. However, the ACK/NACK repetition is preferably configured according to a situation of each cell when aggregating cells each having a different feature.

1. An ACK/NACK repetition mode may be commonly configured for all cells. For example, the ACK/NACK repetition mode of a primary cell is equally applied to aggregated secondary cells.

2. The ACK/NACK repetition mode may be configured independently for each cell. It is allowed to perform suitable transmission according to each uplink cell coverage, geometry environment, available PUCCH resource, etc.

3. The ACK/NACK repetition mode may be commonly configured for a specific secondary cell group or all secondary cells. A specific configuration may be commonly applied to actively cope with a frequent change of the secondary cell.

4. The configuration of the ACK/NACK repetition mode may be allowed only for a PUCCH transmitted in the primary cell. In case of the secondary cell, the ACK/NACK repetition may not be allowed since a geometry environment may be better than that of a macro cell.

<Configuration of ACK/NACK Transmission Mode for Multiple Cells/Multiple Subframes>

In the conventional wireless communication system, a multiple ACK/NACK transmission mode (i.e., this implies that ACK/NACK for a plurality of PDSCHs is transmitted at one time instance) is necessarily configured for all aggregated cells. For example, one of a channel selection method using a PUCCH format 1b and a method of using a PUCCH format 3 is configured.

If PUCCH transmission of a plurality of cells is allowed and each cell transmits multi-cell ACK/NACK for the plurality of cells or if the multi-subframe ACK/NACK for a plurality of subframes is transmitted, the following method may be used.

1. The multiple ACK/NACK transmission mode may be commonly configured. For example, the multiple ACK/NACK transmission mode of the primary cell or the primary cell group may be equally applied to the secondary cell.

2. The multiple ACK/NACK transmission mode may be configured independently for each cell. It is allowed to perform suitable transmission according to each uplink cell coverage, geometry environment, available PUCCH resource, etc.

3. The multiple ACK/NACK transmission mode may be commonly configured for a specific secondary cell group or all secondary cells. A specific configuration may be commonly applied to actively cope with a frequent change of the secondary cell.

4. The channel selection method and the PUCCH format 3 may be allowed in an uplink of a primary cell, and only the PUCCH format 3 may be allowed in an uplink of a secondary cell.

5. The channel selection method and the PUCCH format 3 may be allowed in the uplink of the primary cell, and only the channel selection method may be allowed in the uplink of the secondary cell.

According to the present invention, a configuration and transmission of downlink and uplink resources can be effectively used on the basis of a purposes, configuration type, and channel situation of a cell configured in a situation where a plurality of cells are aggregated in one UE and a cell to be used for actual scheduling of a BS and the UE.

Figure 12:
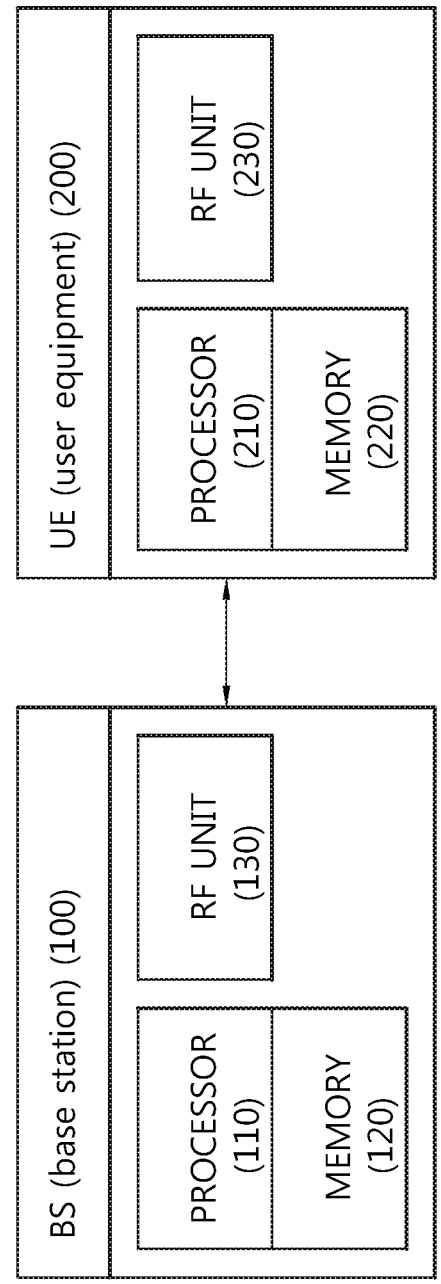
FIG. 12 is a block diagram showing a wireless device according to an embodiment of the present invention.

FIG. 12 is a block diagram showing a wireless device according to an embodiment of the present invention.

ABS 100 includes a processor 110, a memory 120, and a radio frequency (RF) unit 130. The processor 110 implements the proposed functions, procedure, and/or methods. For example, the processor 110 provides a UE with configuration information for PUCCH transmission. For example, it may be informed whether a PUCCH can be transmitted only in a primary cell or can also be transmitted in a secondary cell. The processor 110 allocates a plurality of cells to the UE, and transmits a first parameter set and a second parameter set which are used to determine PUCCH transmission power according to a cell for transmitting the PUCCH. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives configuration information for PUCCH transmission, and transmits a PUCCH according thereto. Further, the processor 210 receives a first parameter set and a second parameter set, determines transmission power of the PUCCH, and transmits the PUCCH. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for controlling transmission power of an uplink control channel of a user equipment for which a plurality of cells are configured, the method comprising:
receiving a first parameter set and a second parameter set, wherein each of the first parameter set and the second parameter set is used to determine the transmission power of the uplink control channel; and
determining the transmission power of the uplink control channel by using the first parameter set or the second parameter set,
wherein if a cell in which the uplink control channel is transmitted is a primary cell, the first parameter set is used, and
wherein if the cell in which the uplink control channel is transmitted is a secondary cell, the second parameter set is used.

2. The method of claim 1, wherein the primary cell is a cell in which the user equipment performs an initial connection establishment procedure or a connection re-establishment procedure with respect to a base station.

3. The method of claim 1, wherein the secondary cell is a cell allocated to the user equipment in addition to the primary cell.

4. The method of claim 1, wherein the first parameter set or the second parameter set is used according to a cell in which the uplink control channel is transmitted among the plurality of cells.

5. The method of claim 1, wherein the first parameter set includes a parameter for a path loss of the primary cell, and the second parameter set includes a parameter for a path loss of the secondary cell.

6. The method of claim 1, wherein the uplink control channel is a physical uplink control channel (PUCCH).

7. The method of claim 1, wherein the uplink control channel is transmitted using the determined transmission power.

8. The method of claim 1, wherein the user equipment transmits the uplink control channel using the primary cell to a first base station or transmits the uplink control channel using the secondary cell to second base station, and
wherein the first base station and the second base station are different from each other.

9. The method of claim 1, wherein the user equipment transmits the uplink control channel using the primary cell or the secondary cell to a same base station.

10. A user equipment comprising:
a radio frequency (RF) unit for transmitting and receiving a radio signal; and
a processor operatively coupled to the RF unit,
wherein the processor is configured to:
receive a first parameter set and a second parameter set, wherein each of the first parameter set and the second parameter set is used to determine the transmission power of the uplink control channel and
determine the transmission power of the uplink control channel by using the first parameter set or the second parameter set,
wherein if a cell in which the uplink control channel is transmitted is a primary cell, the first parameter set is used, and
wherein if the cell in which the uplink control channel is transmitted is a secondary cell, the second parameter set is used.

11. The user equipment of claim 10, wherein the primary cell is a cell in which the user equipment performs an initial connection establishment procedure or a connection re-establishment procedure with respect to a base station.

12. The user equipment of claim 10, wherein the secondary cell is a cell allocated to the user equipment in addition to the primary cell.

13. The user equipment of claim 10, wherein the first parameter set or the second parameter set is used according to a cell in which the uplink control channel is transmitted among the plurality of cells.

14. The user equipment of claim 10, wherein the first parameter set includes a parameter for a path loss of the primary cell, and the second parameter set includes a parameter for a path loss of the secondary cell.

15. The user equipment of claim 10, wherein the uplink control channel is a physical uplink control channel (PUCCH).

16. The user equipment of claim 10, wherein the uplink control channel is transmitted using the determined transmission power.

17. The user equipment of claim 10, wherein the user equipment transmits the uplink control channel using the primary cell to a first base station or transmits the uplink control channel using the secondary cell to second base station, and
wherein the first base station and the second base station are different from each other.

18. The user equipment of claim 10, wherein the user equipment transmits the uplink control channel using the primary cell or the secondary cell to a same base station.

* * * * *